United States Patent [19]
Gordon

[11] 3,795,256
[45] Mar. 5, 1974

[54] TANK WITH INTEGRAL REMOTELY CONTROLLED POWER ACTUATED BOTTOM VALVE

[75] Inventor: Robert E. Gordon, Monson, Mass.
[73] Assignee: Monsanto Company, St. Louis, Mo.
[22] Filed: Jan. 8, 1973
[21] Appl. No.: 321,503

[52] U.S. Cl.............................. 137/386, 137/395
[51] Int. Cl............................................ F16k 21/18
[58] Field of Search... 137/172, 187, 255, 256, 262, 137/386, 392, 389, 393, 395, 396, 558, 571, 574, 575; 251/144, 147, 318; 222/52, 54, 58, 64, 65, 556, DIG. 15

[56] References Cited
UNITED STATES PATENTS
2,694,515  11/1954  Green............................ 222/556 X
2,905,989  9/1959  Black............................ 222/DIG. 15
3,456,789  7/1969  Phipps............................ 222/58 X

*Primary Examiner*—Alan Cohan
*Assistant Examiner*—David R. Matthews
*Attorney, Agent, or Firm*—Joseph S. Nelson; Edward P. Gratten; James C. Logomasini

[57] ABSTRACT

A tank and integral valve assembly suitable for storing and controlling the transfer of viscous fluids. The assembly utilizes a vessel in which is constructed a plug-type valve assembly located so as to regulate rate of egress of viscous fluid from the bottom of the vessel. An actuator assembly on the top side of the vessel controls reciprocal valve plug movements. The actuator is responsive to a level sensor coupled thereto through a controller assembly.

11 Claims, 8 Drawing Figures

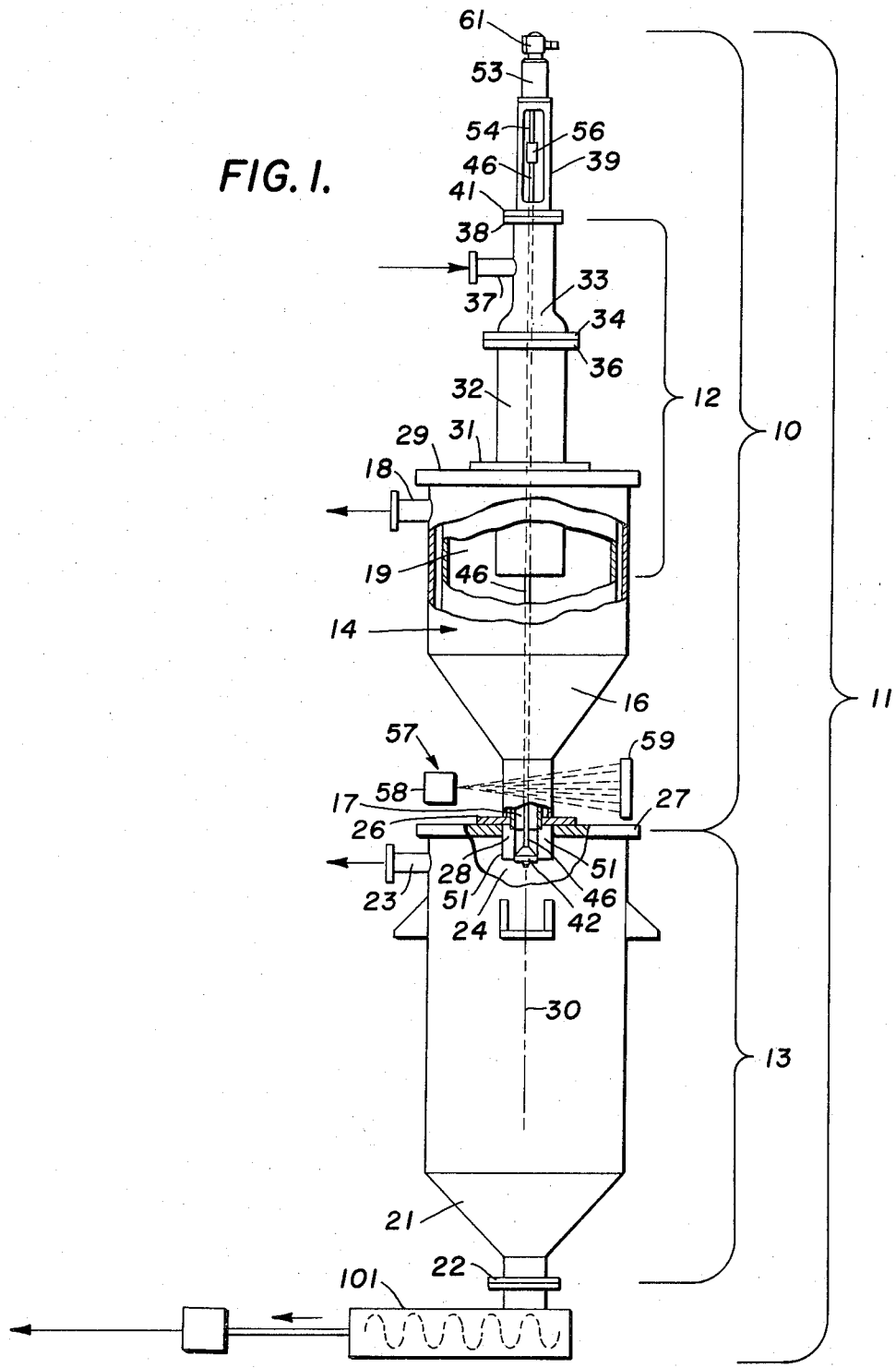
FIG. I.

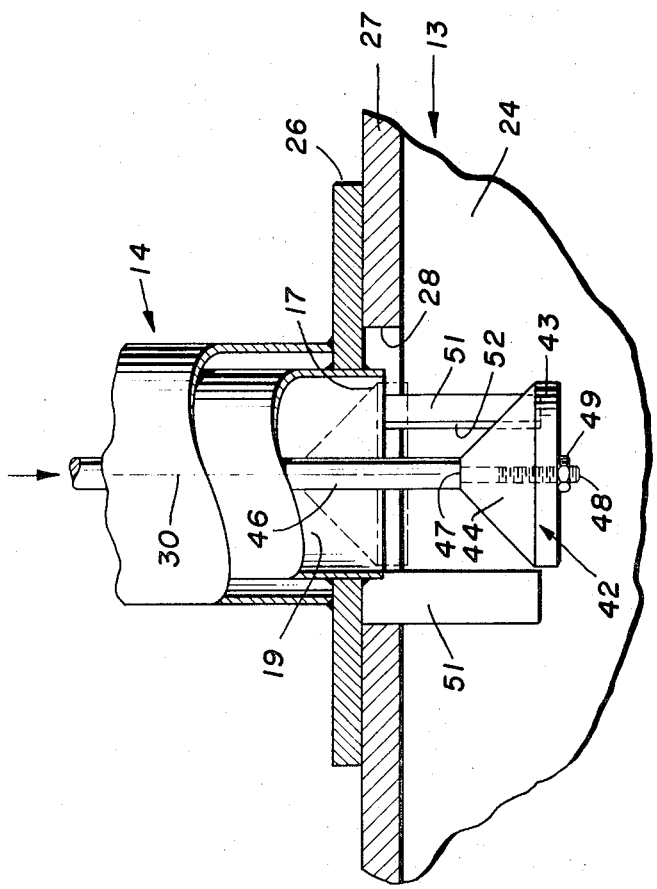
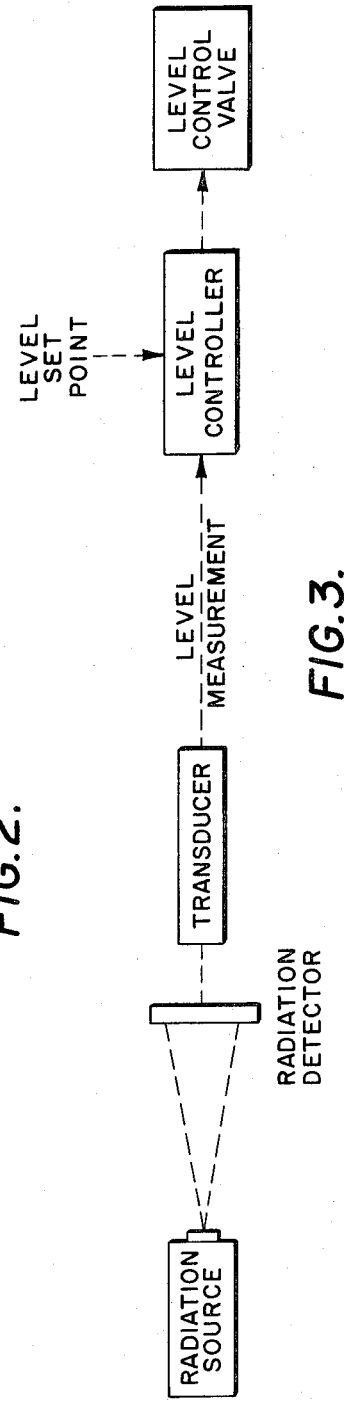

TANK WITH INTEGRAL REMOTELY CONTROLLED POWER ACTUATED BOTTOM VALVE

BACKGROUND

In the chemical industry, it is sometimes necessary to discharge fluid material from one tank into a second tank located below the first tank for temporary storage or holding on a batch or continuous basis in a controlled manner and at a controlled rate. When the fluid material is heated and viscous, the problem of controlled material transfer from one tank to the second can become very severe, particularly when gravitational forces are to be used at least in part to provide the power causing such material to flow from the one to the second tank.

For example, in the falling strand devolatilization of a polymer syrup such as a polystyrene/styrene monomer mixture, it has heretofore been relatively common practice to preheat such syrup, as in a shell and tube preheater, from an already melted condition to a higher temperature and then to discharge the so-heated syrup into a flash chamber (or flash tank) wherein the temperature/pressure relationship is above the boiling point of the styrene monomer but below that of the homopolystyrene polymer so that the monomer is separated from the polymer and removed from the flash chamber as a vapor. Separated monomer vapor is commonly removed from a location near the top of the flash chamber while the polymer, which is in the form of a hot, viscous melt, is pumped or drained from a bottom region of the flash chamber for further processing.

In order to remove as much of the monomer as possible from the polymer, it was and is common to subject the polymer hot melt recovered from a first flash chamber to another sequence of (second) preheater heating followed by passage through a (second) flash chamber, the second preheater generally being at a higher temperature, and the second flash chamber being at a higher temperature and lower pressure than the preceding first-stage of heating/flashing. Recently, an improvement in this falling strand devolatilization procedure has been discovered by which the need for the second preheater has been eliminated and hot melt from a first flash chamber is passed directly into a second flash chamber. Such improved procedure requires control of hot melt transfer from first into second flash chamber not only to regulate flow rate, but also to permit maintenance of a pressure differential between the two chambers. Specifically, it is necessary to maintain the hot melt level in the bottom of a first flash tank at some predetermined value and meter such hot melt from this flash tank into a second flash tank continuously and at a controlled rate.

Such a level maintenance and metering can be accomplished by a pump or valve means. However, owing to the combination of elevated temperatures, pressure differential between the first flash tank and the second flash tank, viscosity of the hot melt fluids involved, rate of hot melt flow from first flash tank into second flash tank, and the like, I have found that a major problem exists in accomplishing hot melt transfer directly from such a first into such a second flash tank. This problem is particularly important in the type of continuous process operation involved in the continuous falling strand devolatilization of a polymer syrup such as a polystyrene/styrene monomer mixture where long periods of continuous, trouble-free operation with a high degree of reliability are contemplated. Furthermore, such an operation should be conducted with relatively simple, relatively low cost, controlled, hot melt transfer means.

SUMMARY

I have now discovered a new and very useful apparatus adapted to store and control the transfer of viscous fluid from a process tank to a subsequent processing operation. This invention is further adapted for use in transferring a hot, viscous fluid from the bottom region of a process tank to a spatially lower process station under conditions partly dependent upon gravitational forces, and this invention is particularly well adapted for transferring such a fluid from such a tank to a second tank which is normally maintained during equipment operation at a pressure lower than that of the (first) process tank.

The invention utilizes relatively simple, easy to maintain components, and provides the capability of operation continuously for extended periods of time with a high degree of reliability.

The invention may be used more or less as a separate system in practicing some chemical or physical operation upon fluid materials, or it may be used in combination with other elements as a sub-combination of a greater system. For example, in this last connection, the invention may be used as part of a falling-strand devolatilizer which employs a preheater preceding two subsequent flash chambers wherein the present invention is utilized below the first flash vessel as the fluid transfer arrangement. Those skilled in the art of chemical industry process techniques, however, will readily appreciate that the present invention is useful in many different applications.

Briefly, the present invention employs as one element a generally enclosed vessel having adjacent one end region thereof a generally funnel shaped or tapered configuration, the vessel being adapted to be oriented spatially with such tapered end region downwardly extending. The vessel has one port defined in an apex portion of the tapered end section (as in a terminal pipe section or the like), and another port defined in the opposed end region thereof. The vessel may have additional ports depending on the end use application contemplated, as desired by a particular end user.

A valve plate means is provided in and about the port which is lowermost when such vessel is oriented with its tapered end region downwardly oriented. Such valve plate means extends generally circumferentially about, and transversely across, such port. This valve plate means is also arranged so as to extend generally normally to the other port above indicated so that the axis of the valve plate means passes through both of the ports (the one being equipped with such a valve plate means). The valve plate may be integral with and/or form a part of the construction material used to make such vessel and define such (lowermost) port means, or otherwise, as those skilled in the art will appreciate.

A valve plug means is positioned generally in the valve plate means. This valve plug means is adapted for reciprocal sliding-type movements in and through the central aperture defined by the valve plate means generally along and coaxially with the axis above mentioned. The valve plug means when in a closed position across the aperture defined by the valve plate means substantially closes such aperture.

An elongated valve stem means is engaged at one end thereof with the valve plug means. This valve stem means is generally ciaxial with the indicated axis and this valve stem means extends through the interior of the vessel and projects out through such other ports.

At least three valve plug guide rail means are circumferentially located about the port equipped with the valve plug means and valve plate means. These valve plug guide rail means are adapted, relative to the valve plug means, either to be fixed or to be reciprocally movable therewith. Each of the guide rail means has an edge portion whose surfaces are generally equally distant from, and parallely extending with, the indicated axis. Together, the guide rail means are adapted to coact during reciprocal movements of the valve plug means to maintain said valve plug means in a generally centered configuration relative to said valve plate means.

Located adjacent to such other port is support means which is generally fixed in spacial relationship to the vessel itself. The support means is equipped with bearing means adapted to engage the valve stem means protruding through such other port and to permit reciprocal sliding-type movements of the valve stem means through the bearing means.

A variable actuator means is exteriorly located with respect to the vessel and is associated with the support means. This actuator means is engaged with an exposed terminal region of the valve stem means, and this actuator means is adapted in response to signal means applied thereto to move reciprocally the valve stem means relative to the vessel.

Level sensing means is associated with the vessel when the vessel is generally spatially oriented so as to have the indicated axis vertically extending with the valve equipped port lowermost. This level sensing means is adapted to measure a fluid level in the vessel and to generate a signal means in response thereto when the vessel is functioning with the valve equipped port downwardly oriented spacially.

A controller means functionally interconnects the level sensing means and the actuator means. The controller means is adapted, in response to signals from a level sensing means, to generate control signals for the actuator means. In this way, reciprocal movements of the valve stem means, and the associated valve plug means, are controlled in a predetermined manner so that a predetermined variable aperture is maintainable between the valve plate means and the valve plug means, thereby to regulate fluid moving therethrough when the vessel is so functioning.

FIGURE DESCRIPTION

The invention is better understood by reference to the attached drawings wherein:

FIG. 1 is a side elevational view of one falling strand devolatilizer apparatus incorporating an embodiment of the present invention, some parts thereof broken away and some parts thereof shown in section;

FIG. 2 is an enlarged, detailed view in side elevation of the valve assembly used in the embodiment of FIG. 1, some parts thereof broken away and some parts thereof shown in section;

FIG. 3 is a block diagrammatic view of a level control system suitable for use with the valve assembly of FIG. 2;

Figure 4:
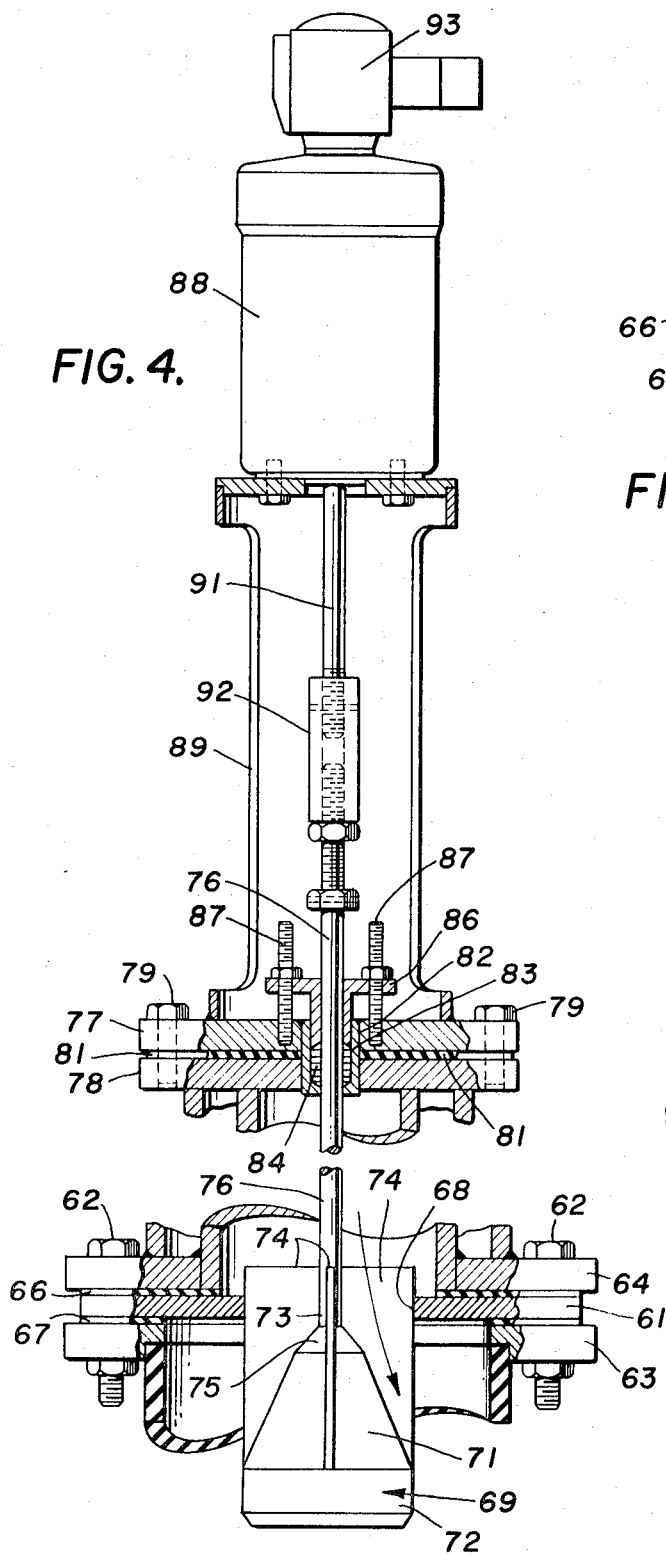
FIG. 4 is a partial side elevational view of an alternative embodiment of the present invention, some parts thereof broken away and some parts thereof shown in section.
Figure 5:
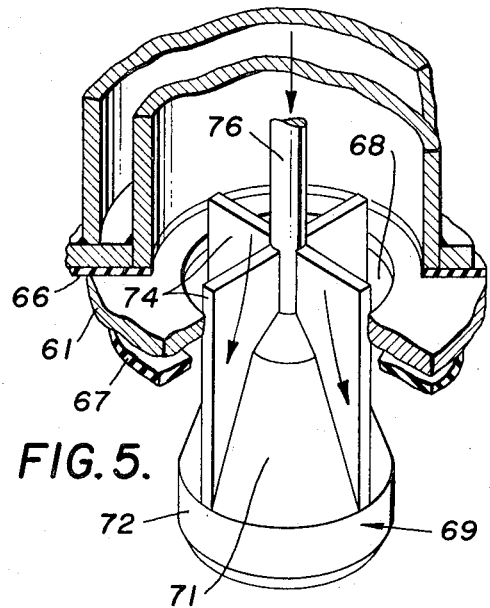
FIG. 5 is a partial perspective view showing the valve plug assembly of the embodiment of FIG. 4 is an open position.
Figure 6:
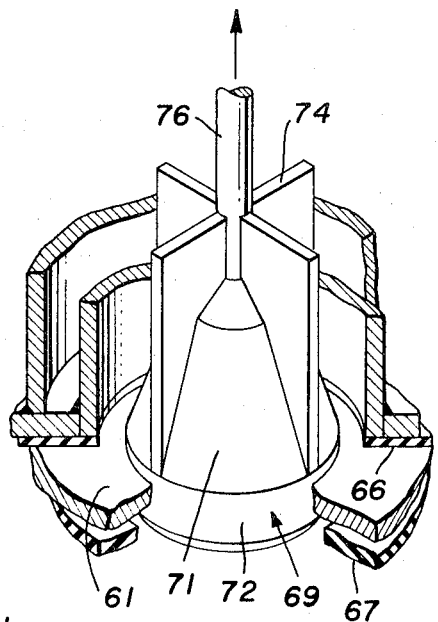
FIG. 6 is a view similar to FIG. 5 but showing the valve plug assembly in a closed position.
Figure 7:
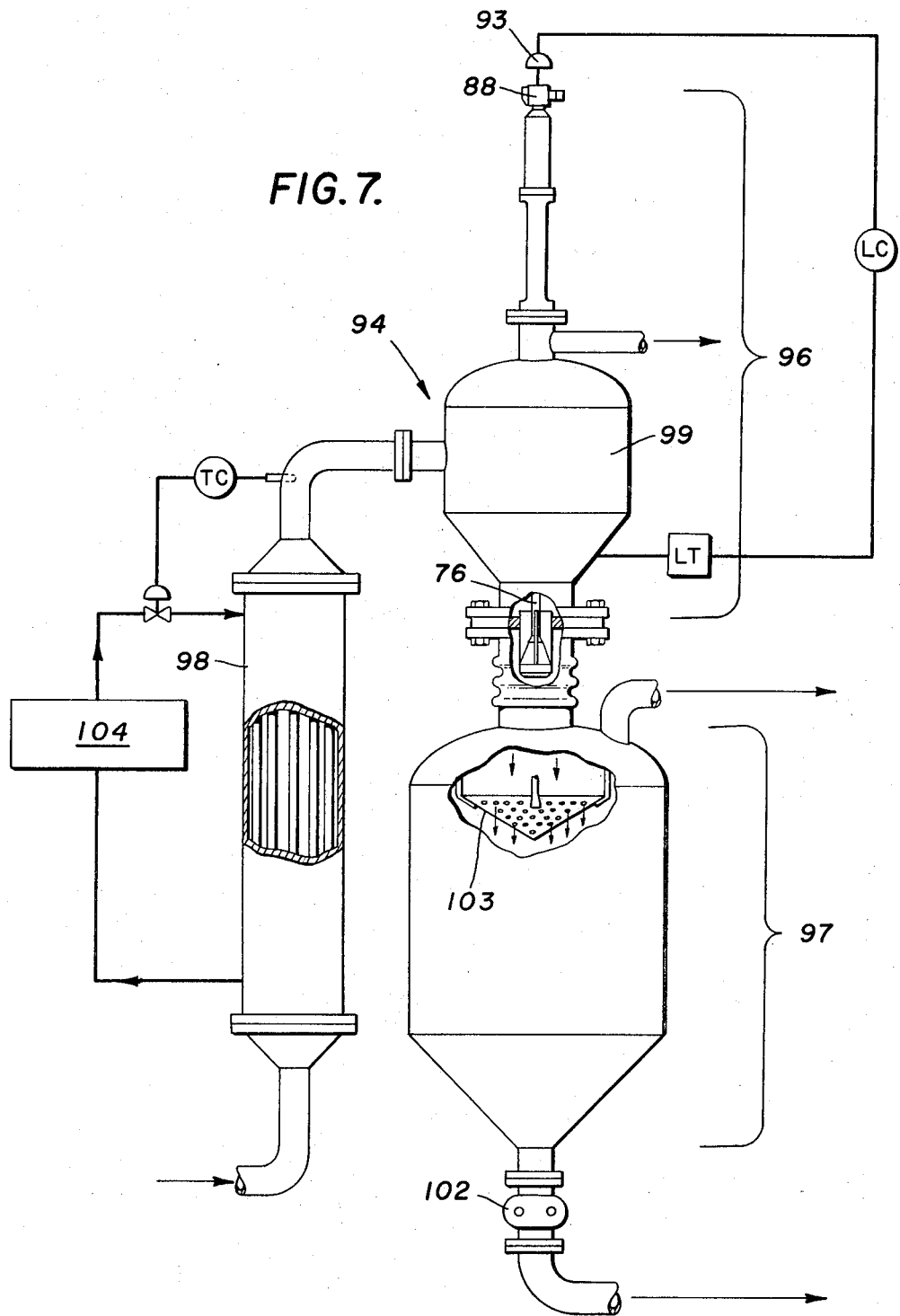
Figure 8:
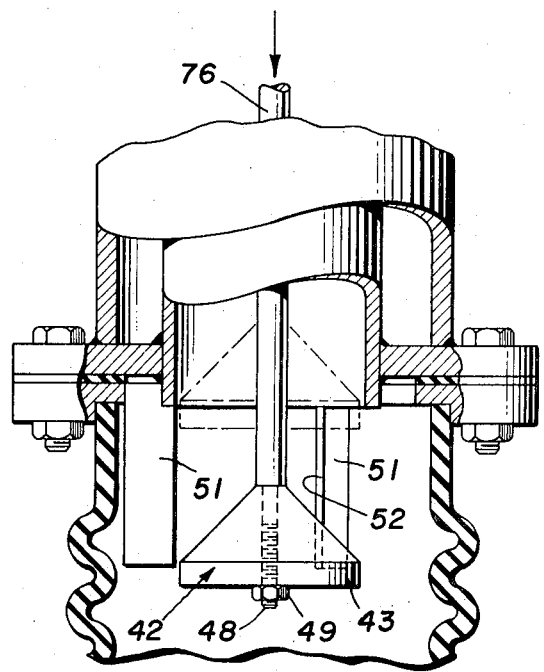

FIG. 7 is a side elevational view of another falling strand devolatilizer apparatus incorporating the embodiment of FIG. 4–6, some parts thereof broken away and some parts thereof shown in section; and FIG. 8 is an enlarged detailed view in side elevation showing the form of valve assembly employed in the embodiment of FIGS. 1–3 and used in the devolatilizer of FIGS. 4–6 here modified so as to be incorporated into the devolatilizer of FIG. 7.

DETAILED DESCRIPTION

Turning to FIG. 1, there is seen illustrated a first embodiment of this invention herein designated in its entirety by the numeral 10. As shown in FIG. 1, embodiment 10 is incorporated into a falling strand devolatilizer apparatus herein designated in its entirety by the numeral 11. Devolatilizer 11 can be considered to be composed of a shell and tube heat exchanger assembly 12, a vessel 14 or first flash tank which comprises part of the embodiment 10 of the present invention, and a second flash tank 13.

The shell and tube heat exchanger assembly 12 is adapted for the input, passage through, and discharge from, the tubes thereof (not shown) of process fluid (not shown). Heat exchanger assembly 12 is further adapted for the receipt, passage through, and discharge from, the shell interior thereof (not shown) of heat exchange fluid for heat transfer from said heat exchange fluid to said process fluid.

Vessel 14 has a tapered lower region 16 which terminates in a discharge port 17. Vessel 14 also has a vapor take-off port formed by pipe and flange assembly 18. The assembly 18 communicates with the interior space 19 of vessel 14.

Vessel 14 in this application of embodiment 10 is of double walled, jacketed construction for purposes of controlling the interior temperatures of vessel 14 during operation of the devolatilizer 11.

Second flash tank 13 is likewise of double walled, jacketed construction for similar purposes. Tank 13 also has a tapered lower portion or region 21 which terminates in a discharge port, the flange 22 marking the position of such discharge port. A vapor take-off port is provided by the pipe and flange assembly 23 which communicates with the interior space 24 of flash tank 13.

Vessel 14 is positioned spacially above flash tank 13. The flange 26 at the lower end of vessel 14 about the discharge port 17 abuts against the top plate 27 of the second flash tank 13. Flange 26 is brought into sealing engagement with top plate 27 by a gasket (not shown) and flange 26 is secured to top plate 27 by nut and bolt assemblies (not shown). Vessel 14 is axially aligned with tank 13 and the discharge port 17 is aligned with an input port 28 in tank 13.

The heat exchanger assembly 12 is axially aligned with vessel 14 so that the tubes thereof (not shown) are in a generally vertical position. Heat exchanger assembly 12 protrudes down into vessel 14 and is supported on the top plate 29 of vessel 14 by a flange 31 secured to the heat exchanger assembly 12. Sealing means (not shown) is interposed between flange 31 and top plate 29 and top plate 29 and flange 31 are secured together by nut and bolt assemblies (not shown). The heat exchanger assembly 12, itself, is composed of two main subassemblies; a shell and tube core designated by the numeral 32 and a header designated by the numeral 33. The shell and tube core 32 are of conventional construction. The header 33 and the upper end of the shell and tube core 32 mate together by means of flanges 34 and 36, respectively, the flanges 34 and 36 having interposed therebetween appropriate sealing means (not shown) and being secured together by nut and bolt assemblies (not shown). An input port to header 33 is provided by pipe and flange assembly 37 which communicates with the interior (not shown) of header 33. The top of header 33 terminates in a flange 38.

Over header 33 is positioned pedestal 39. The base of pedestal 39 is mounted to a flange 41, the flange 41 being secured to the flange 38 by nut and bolt assemblies (not shown) with an appropriate sealing gasket (not shown) interposed therebetween.

In the region of discharge port 17 and input port 28 is mounted a valve plug 42. Referring to FIG. 2 for convenience, it it seen that the valve plug 42 is generally cross-sectionally circular and has a bottom portion 43 whose diameter is slightly less than the diameter of the mouth of discharge port 17. The mount of discharge 17 serves as a valve plate means extending generally circumferentially about such mouth. This valve plate means is thus normally positioned with respect to the vertical axis of the vessel 14. The valve plug 42 has an upper portion 44 which is integral with the lower portion 43. The outside walls of upper portion 44 extend generally conically upwardly towards a (hypothetical) apex along the vertical axis 30 of vessel 14. An elongated valve stem 46 extends from the apex region 47 of valve plug 42 upwardly. Valve stem 46 is conveniently secured to valve plug 42 by means of a threaded stub shaft 48 and nut 49, the stub shaft 48 being generally coaxial with the valve steam 46 and being conveniently formed by reducing the diameter of the lower end of valve stem 46, on the like. The valve stem 46 extends from the valve plug 42 upwardly through vessel 14, through the shell and tube heat exchanger assembly 12 (there being an appropriate axial channel formed therein, not shown), through header 33 and into pedestal 39. Valve stem sealing means (not shown) but depending from flange 41 and of the type hereinafter described in reference to FIG. 4 below is provided. The valve stem 46 is thus maintained generally coaxial with the vertical axis of the assembly. As those skilled in the art will appreciate, many different contours for valve plug 42 may be employed without departing from the spirit and scope of the present invention.

Three valve plug guide rail means 51 are located circumferentially about port 17 in spaced relationship to one another, each valve plug guide rail extends generally parallely to the vertical axis downwardly from the discharge port 17 being secured to the bottom terminal wall of the vessel 14 here by welding. Each guide rail 51 has an edge portion 52 whose surfaces are generally equally distant from the vertical axis 30. Except for edge portions, any convenient body shape and any convenient number (preferably at least three) of guide rail means may be employed in this invention. The guide rails are adapted to coact together and permit the valve plug 42 to remain substantially centered on the vertical axis 30 when the valve plug 42 slides reciprocally along axis 30 together with the valve stem 46. The guide rails 51 maintain the valve plug 42 in a generally centered configuration relative to the valve plate formed by the mouth of discharge port 17. Bearing means (not shown here, but of the character described in reference to FIG. 4 hereinafter) in the region of flange 41 engage and guide the valve stem 46 during such reciprocal movements of the valve plug 42.

An actuator means, herein designated in its entirety by the numeral 53, is provided to move the valve stem 46 reciprocally in response to signal means applied to such actuator means 53. Pedestal 39 serves as a base on which the actuator means 53 is mounted peripherally. The actuator means 53 has a reciprocating shaft 54. The lower end reciprocating shaft 54 is interconnected with the upper end of valve stem 46 by means of a collar 56. While any convenient conventional design for actuator means 53 may be employed, the actuator means 53 is preferably of the conventional pneumatic type well known to those skilled in the art. Observe that the construction and interrelation between elements employed in the embodiment 10 is such that the actuator means is completely outside of the interior of the vessel 14 so that the valve plug 42 is regulated and controlled from a position remote from the valve plug 42 itself. Observe that, so far as the embodiment 10 is concerned, the heat exchanger 12 functions cooperatively with the pedestal 39 to provide support means in generally fixed spacial relationship to the vessel 14 which support means is located adjacent to a top port (not numbered) in the vessel 14 through which the valve stem 46 extends.

In order to measure process fluid level in the vessel 14, more particularly, in the lower most region of the vessel 14 of embodiment 10, a level sensing means herein designated in its entirety by the numeral 57 is employed. The level sensing means 57 not only measures fluid level in the vessel 14 but also generates a signal means in response thereto which is representative thereof when the vessel 14 is functioning in the devolatilizer 11. In the embodiment 10, the level sensing means comprises a gamma ray emitter 58 and a gamma ray detector 59. Gamma rays emitted by emitter 58 pass through vessel 14 and are detected by the detector 59. Any convenient level sensing means, as those skilled in the art will appreciate, may be used for level sensing in the practice of the present invention, but level measurement by radiation is preferred.

A controller 61 adapted to apply control signals to the actuator 53 after comparing a signal from the level sensing means 57 to some set signal is provided. The controller 61 is generally responsive to a predetermined set signal and functionally interconnects the level sensing means 57 with the actuator means 53. Controller 61 can be of any suitable conventional design.

The interrelationship between the level sensing means 57, the actuator means 53, and the controller 61 is depicted in block diagrammatic form in FIG. 3. Thus, gamma radiation emitted and detected by, respectively, the radiation source and radiation detector, are fed to a transducer where a signal output is generated which is representative of variations of fluid level in the vessel 14, thereby to complete the level measurement. The output from the transducer is fed to a level controller where the level measurement signal is compared to a predetermined level set point and an output signal generated which is fed to the actuator means associated with the valve stem 46, the whole being referenced in FIG. 3 as the level control valve.

Turning to FIGS. 4-6, there is seen another embodiment of the present invention. Here, a valve plate 61 is clamped by means of nut and bolt assemblies 62 between a pair of flanges 63 and 64. The valve plate 61 is maintained in sealing engagement between the flanges 63 and 64 by means of gaskets 66 and 67. Valve plate 61 has formed therein centrally a circular aperture 68 (see, for example, FIG. 5). Positioned generally within the aperture 68 and adapted for reciprocal sliding mvements in aperture 68 on an axis generally normal to plate 61 is a valve plug hereindesignated in its entirety by the numeral 69. The valve plug 69 has an upper portion 71 which is integral with a lower portion 72. The outside walls of the upper portion 71 extend generally conically upwardly from the bottom portion 72 towards an apex region 73 in the embodiment shown, near the apex region 73, the slope of the conical portions of the outside walls of upper portion 71 increases in an area designated as 75.

Valve plug 69 further has at least three, and in the embodiment shown, four guide plates 74. Each guide plate 74 is generally integral with the outside wall of upper portion 71 of plug 69 so that the diameter of the lower portion 72 of valve plug 69 is not exceeded by the dimensions of guide plates 74 on the valve plug 69. Each guide plate 74 extends radially outwardly from valve plug 69. The outside edge of each guide plate 74 is thus generally aligned with the outside surface of bottom portion 71 of valve plug 69 so that the guide plates 74 taken together generally center the valve plug 69 in the aperture 68 during reciprocal sliding movements of the valve plug 69 in aperture 68.

An elongated valve stem 76 extends from engagement with the apex region 73 of valve plug 69 upwardly through a pair of flanges 77 and 78, such flanges being maintained clamped together by means of screw assembly 79, there being a gasket 81 positioned therebetween to maintain sealing engagement between flanges 77 and 78. To seal the valve stem 76, relative to the flanges 77 and 78 and to permit the stem 76 to slide axially and reciprocally therebetween is a packing gland herein designated in its entirety by the numeral 82. Packing gland 82 utilizes a sleeve 83 which in the embodiment shown is conveniently welded or the like to the flange 77 for which an appropriate mating aperture is provided in flange 78. Packing material 84 is inserted into sleeve 83 and a cross-sectionally T-shapd compressor sleeve 86 is circumferentially positioned about a stem 76. The forward end of the sleeve 86 is brought to bear against the packing 84 and is maintained in contact therewith by means of adjustable threaded stud and nut assemblies 87, each stud of each assembly being mounted in the flange 77.

To move the valve stem 76, an acatuator means is provided which is herein designated in its entirety by the numeral 88. Actuator means 88 is mounted in fixed spacial relationship to the flange 77 by means of pedestal 89. As in the case of the preceding embodiment, the actuator means employed in the present embodiment is of a conventional type, such as a long stroke pneumatic type utilizing a rolling diaphragm, a piston in a cylinder type, or the like. Thus, a reciprocating shaft 91 engages the valve stem 76 by means of a collar 92.

Functionally associated with the actuator 88 is a positioned controller 93 which in the embodiment shown is mounted over and upon the actuator means 88. The control system for reciprocally moving the valve plug 69 in response to level measurement is as illustrated earlier in reference to FIG. 3.

The position of the valve plug 69 relative to valve plate 61 when the valve plug 69 is in a closed position is illustrated in FIG. 6. Similarly, the position of the valve plug 69 relative to the valve plate 61 when the valve plug 69 is in an open position is illustrated in FIG. 5.

Referring to FIG. 7, there is seen another falling strand devolatilizer apparatus herein designated in its entirety by the numeral 94. Devolatilizer 94 incorporates the embodiment of this invention shown in FIGS. 4-6. Here, such embodiment, which is designated in its entirety by the numeral 96 comprises the first flash chamber and variable fluid transfer regulation means functionally positioned between the first flash chamber and the second flash chamber, the latter being designated herein in its entirety by the numeral 97. Observe that here, a shell and tube heat exchanger 98 is placed off to one side relative to the first flash chamber 99 so there is no need for the valve stem 76 to project upwardly through the shell and tube heat exchanger in order to obtain the desired exterior position for the actuator means 88.

In FIG. 7 the perforated inverted conically shaped member 103 aids in stranding a viscous hot melt being devolatilized in vessel 97. Heat exchange fluid for circulation in the shell portion of heat exchanger 98 is conveniently heated in heater 104 with appropriate conventional control elements as shown.

Devolatilizer 11 and Devolatilizer 94 operate similarly; thus, process fluid enters and passes through the heat exchanger, and each apparatus, and from the heat exchanger the process fluid passes into the second flash chamber. Passage of fluid from first to second flash chamber is controlled by the valve assembly and control mechanism so that separate pressures are maintainable in each of the respective flash chambers. Process fluid in the second flash chamber is removed therefrom by any convenient means, as, for example, by a melt pump 101 in the devolatilizer 11 or by a melt pump 102 in the devolatilizer 94.

Because of the pressure drop across the heat exchanger 32 or 98 in devolatilizers 11 and 94, respectively, there is a higher absolute pressure on the input side thereof than on the output side. Thus, in devolatilizer 11 (see FIG. 1) the packaging gland about stem 46 is at a higher absolute pressure on the process side thereof. Furthermore in devolatilizer 11, viscous liquid contacts one side of the gland which hot vapor contacts on such of the gland in devolatilizer 94. Consequently, it is preferred that, when the apparatus of this invention is used in a devolatilizer, the heat exchanger be generally over the vessel, as in devolatilizer 11, and form a part of the support means supporting the valve stem and variable actuator means, because preventing ingress atmosphere air through the seal along the valve stem into the space inside the vessel (comprising the first flash chamber) is much more readily accomplished with such an apparatus configuration.

Because of the very high viscosity of liquid which may be handled by this valve, plug 42 or 69 in devolatilizers 11 or 94, respectively, a positive seal may be obtained in the presence of such a liquid even with a significant annular clearance between the outside diameter of the valve plug and the inside diameter of the channel of the embodiment in FIGS. 1, 2, 8 or valve plate of the embodiment of FIGS. 4, 5, 6, 7. To preclude valve seizure or binding due to unequal temperatures there is utilized diametral clearances in the order of about 0.006 inch per inch of plug diameter. Overlap of the fixed and movable cylindrical members when the valve is in closed position is typically ⅛ to ¼ inch. Greater or smaller clearances and overlaps may, of course, be used, if desired in a given use situation. It would, of course, also be possible to utilize well known seating between flat surfaces perpendicular to the shaft, or conical sections, or either of these in which one or both surfaces was curved, without materially altering the capability or concept of this invention. However, particularly when highly viscous liquids are to be processed, such seating tends only to add to cost and complexity of the mechanism without functional benefit.

Other and further embodiments of the present invention will be apparent to those skilled in the art and the present description should not be taken to limit this invention to the illustrated embodiments herein.

What is claimed is:

1. A tank and integral valve assembly adapted for the storage and controlled transfer therefrom of viscous fluid and comprising in combination:

A. a generally enclosed vessel having adjacent one end region thereof a generally funnel-shaped configuration, said vessel being adapted to be oriented spacially with said one end region downwardly, said vessel having one port defined in an apex portion of said one end region, and another port defined in the opposed end region thereof, B. valve plate means extending generally circumferentially about said one port and defining an aperture thereacross, said valve plate means also extending generally normally to said other port whereby the vertical axis of said valve plate means passes through both of said ports, C. valve plug means positioned generally in said valve plate means and adapted for reciprocal sliding movements therein generally on said vertical axis, said valve plug means further being adapted to substantially shut said aperture when in a closed position relative thereto, D. elongated valve stem means engaged at one end thereof with said valve plug means, said valve stem means being generally coaxial with said vertical axis, said valve stem means extending through the interior of said vessel and projecting through said other port, E. at least three valve plug guide rail means circumferentially located about said one port and adapted relative to said valve plug means either to be fixed or to be reciprocally movable therewith, each of said guide rail means having an edge portion whose surfaces are generally equally distant from said vertical axis, said guide rail means being further adapted to coact together during reciprocal movements of said valve plug means to maintain said valve plug means in a generally centered configuration relative to said valve plate means, F. support means in generally fixed spacial relationship to said vessel located adjacent said other port and having bearing means adapted to engage said valve stem means and permit reciprocal sliding movements thereof therethrough, and including sealing means adapted to seal said valve stem means relative to the interior of said vessel when said vessel is functioning, G. variable actuator means exteriorly located with respect to said vessel and associated with said support means, said actuator means being engaged with an exposed terminal region of said valve stem means and adapted in response to signal means applied thereto to move reciprocally said valve stem means relative to said vessel, H. level sensing means associated with said vessel and adapted both to measure a fluid level in said vessel and to generate a signal means in response thereto when said vessel is functioning with said end region downwardly oriented spacially, and I. controller means functionally interconnecting said level sensing means and said actuator means and adapted in response to signals for said actuator means to control reciprocal movements if said valve stem means and said valve plug means engaged therewith in a predetermined manner whereby a predetermined variable aperture is maintainable between said valve plate means and said valve plug means.

2. The assembly of claim 1 wherein said level sensing means comprises a gamma ray emitter located adjacent said one end region of said vessel exteriorly thereof, a gamma ray sensor located adjacent said one end region of said vessel exteriorly thereof but on an opposite side of said vessel relative to said emitter, and correlator means adapted to make said sensor and said emitter adapted to detect variations in said fluid level and to generate a signal means responsive thereto.

3. The assembly of claim 1 wherein said valve plug guide rail means are fixed to said valve plug means.

4. The assembly of claim 1 wherein said valve plug guide rail means are fixed at least partially to said valve plate means and extend downwardly relative to said valve plate means.

5. The assembly of claim 1 wherein said vessel interconnects with another vessel at said one end region below said valve plate means.

6. The assembly of claim 1 wherein said vessel has defined therein one additional port in an upper wall region thereof.

7. The assembly of claim 6 wherein said vessel has defined therein at least an additional port in an upper wall region thereof.

8. The assembly of claim 6 wherein one of said additional ports interconnects with a source of low pressure and another of said additional ports interconnects with a source of process fluid.

9. The assembly of claim 8 wherein said vessel interconnects with another vessel at said one end region below said valve plate means and said other vessel is connected with a source of pressure lower than said pressure source interconnected with said vessel.

10. The assembly of claim 1 wherein said vessel is jacketed for circulation of heat exchange fluid.

11. The assembly of claim 1 wherein said level sensing means is adjacent said one end region.

* * * * *